Oct. 15, 1963 S. D. SILLIMAN ETAL 3,107,340

REMOTE SIGNAL SYSTEMS

Filed July 9, 1957 15 Sheets-Sheet 1

Oct. 15, 1963 S. D. SILLIMAN ET AL 3,107,340

REMOTE SIGNAL SYSTEMS

Filed July 9, 1957 15 Sheets-Sheet 2

Fig. IC.
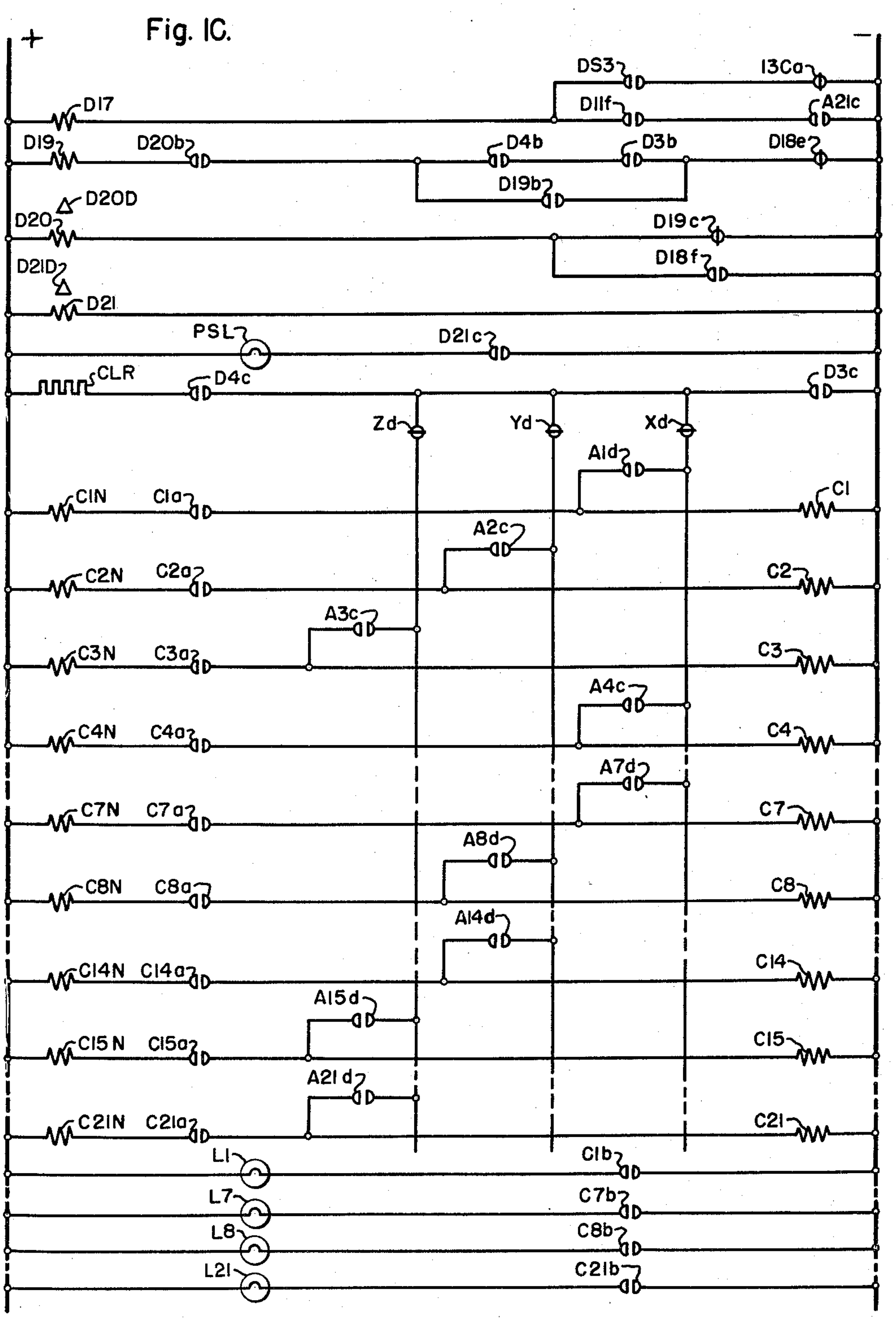

* Make Before Break

* Make Before Break

* Make Before Break

Oct. 15, 1963 S. D. SILLIMAN ETAL 3,107,340

REMOTE SIGNAL SYSTEMS

Filed July 9, 1957 15 Sheets-Sheet 14

United States Patent Office 3,107,340
Patented Oct. 15, 1963

3,107,340
REMOTE SIGNAL SYSTEMS
Sheldon D. Silliman, Forest Hills, and Willard A. Derr, Pittsburgh, Pa., assignors to Westinghouse Electric Corporation, East Pittsburgh, Pa., a corporation of Pennsylvania
Filed July 9, 1957, Ser. No. 670,756
12 Claims. (Cl. 340—163)

Figure 1A:
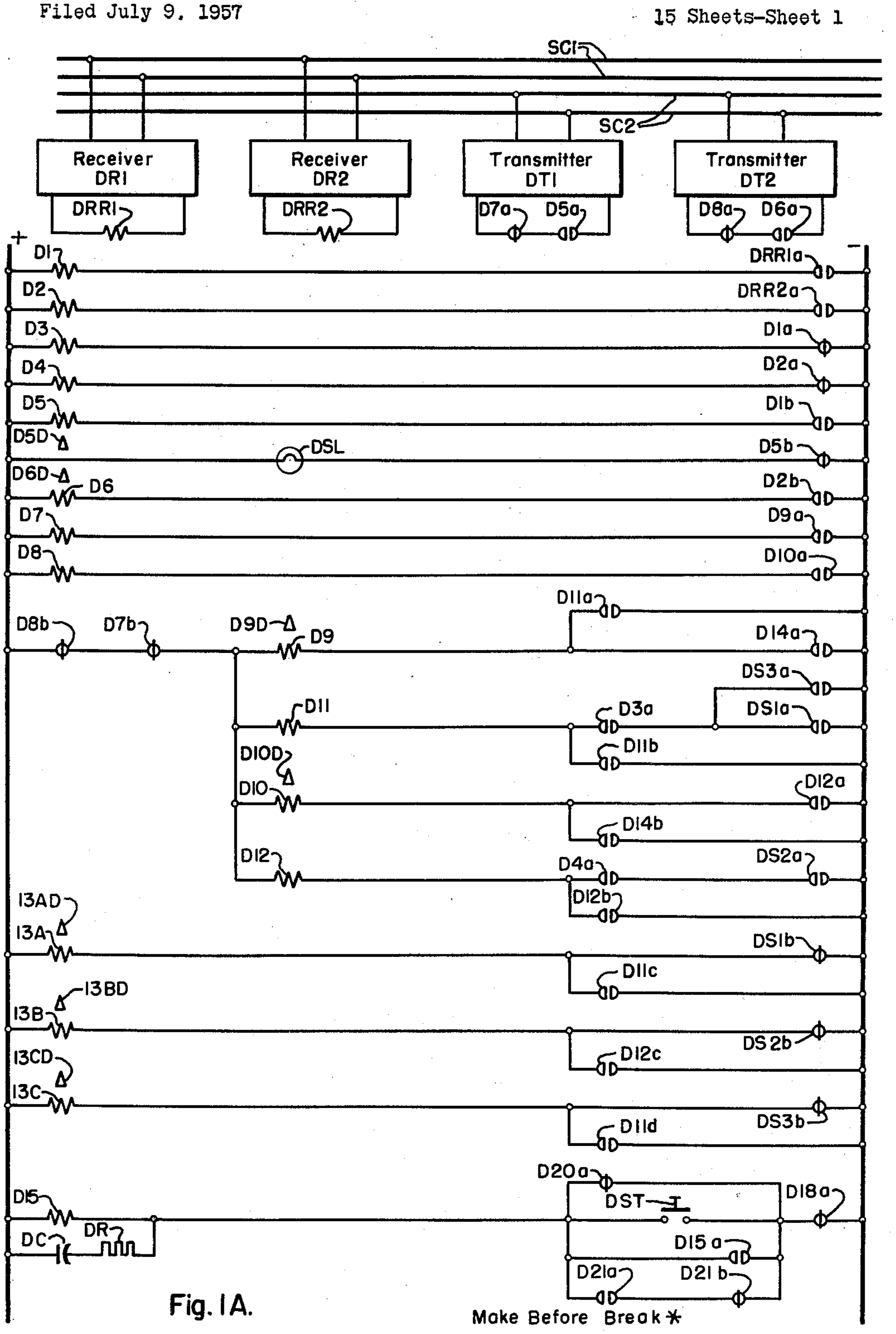

Our invention relates generally to remote signal systems, and it has reference in particular to a remote indication signal system.

Generally stated, it is an object of our invention to provide a remote position indication system for a plurality of devices, that is simple and inexpensive to manufacture, and is reliable and effective in operation.

More specifically, it is an object of our invention to provide in a remote indication system for scanning the positions of a plurality of devices, transmitting different signals in accordance with the positions of the devices, and for interposing between predetermined groups of position signals, check signals.

Another object of our invention is to provide in a remote position scanning system for indicating the positions of a plurality of devices by transmitting different signals corresponding to the positions of the devices in a plurality of groups separated by synchronization check signals of different predetermined types.

Yet another object of our invention is to provide in a position indication system for starting a scanning operation of the positions of a plurality of devices and, after sending to a remote station a predetermined number of signals, which is less than the total number, corresponding to the positions of certain ones of the devices, interposing a predetermined check signal which, if not acknowledged by the remote station, causes a repetition of the whole scanning operation after it has once been completed.

It is also an object of our invention to provide in a remote indication system for consecutively scanning the positions of a plurality of devices and transmitting groups of signals of one kind or another dependent on the positions of each of a plurality of devices having two operating positions, and for interposing after each group of indication signals predetermined synchronization check signals.

Another important object of our invention is to provide in a remote indication system for restarting a scanning operation of the positions of a plurality of devices when such scanning operation is once completed, unless predetermined check signals interposed between different groups of the indication signals are acknowledged within a predetermined time.

Other objects will in part be obvious, and will in part be explained hereinafter.

In practicing our invention in accordance with one of its embodiments, the position of each of a plurality of switches at a remote station is scanned one after the other in sequence by using counting means in conjunction with position responsive relays to effect selective operation of one or the other of two frequency shift tone transmitters which normally operate on different frequencies, to shift and produce successive signals of yet other different frequencies depending on whether each switch is open or closed. The positions of the switches are scanned in groups, and after the positions of the one group of the plurality of switches are thus scanned, one of the tones is shifted to produce a synchronization check signal. At the control or receiving station, the successive indication signals operate one or the other of two receivers and effect operation of counting means to successively operate indicating relays in accordance with the positions of the switches at the remote station. Receipt of each synchronization check signal effects operation of a particular one of two transmitters at the receiving station to produce a corresponding check signal, which effects continuation of the scanning operation for the next group of switches at the remote station or effects reset of the equipment after the last group is scanned. If such check signal is not received within a predetermined time, the scanning of the next group is nevertheless continued, but at the end of the scanning operation, the whole operation is repeated.

Figure 1B:
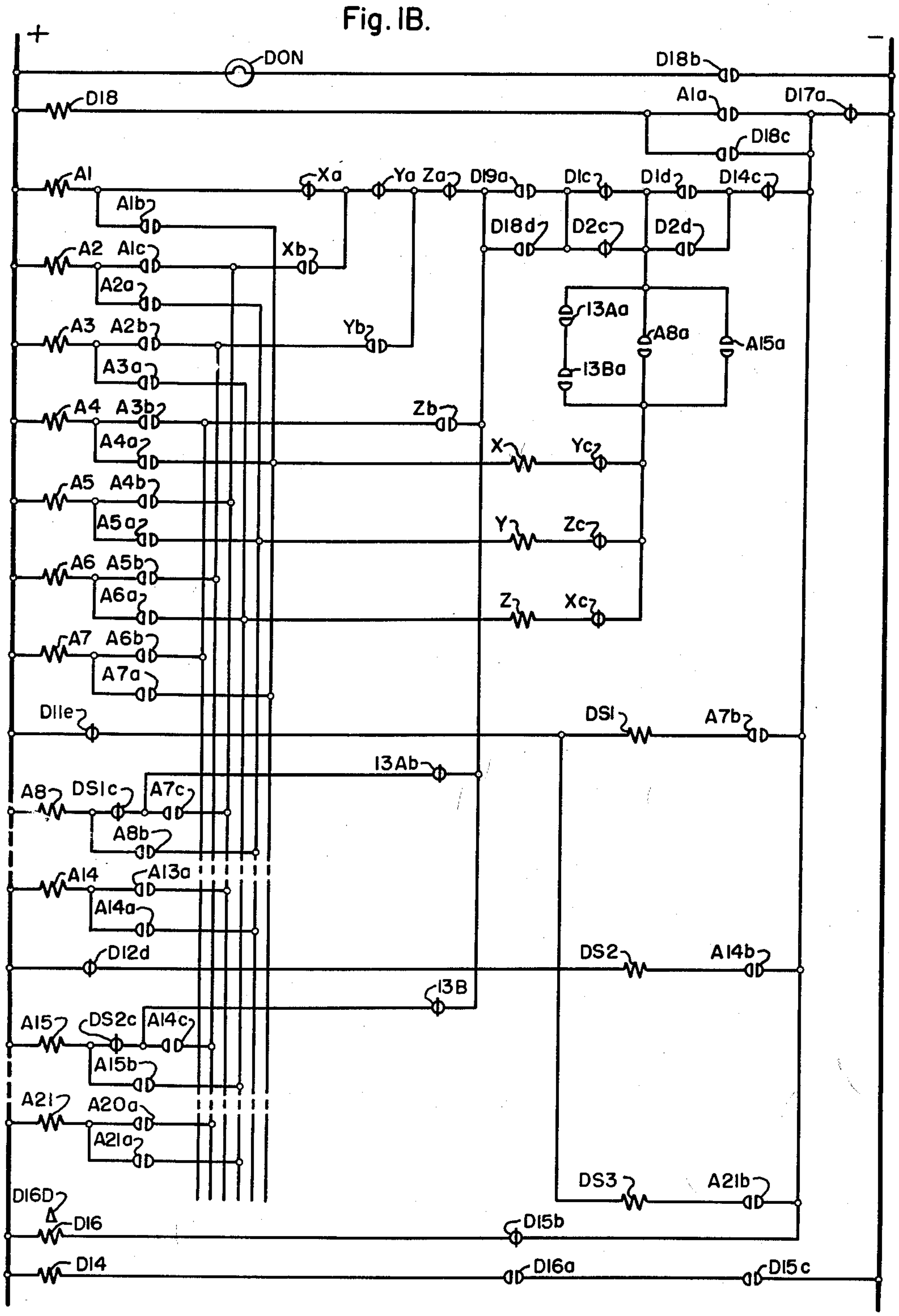

For a more complete understanding of the nature and scope of our invention, reference may be made to the following detailed description, which may be read in connection with the accompanying drawings, in which:

FIGURES 1A through 1C, when placed one below the other in order, provide a schematic diagram of the indication apparatus at a receiving or decoding station embodying the invention in one of its forms.

Figure 2A:
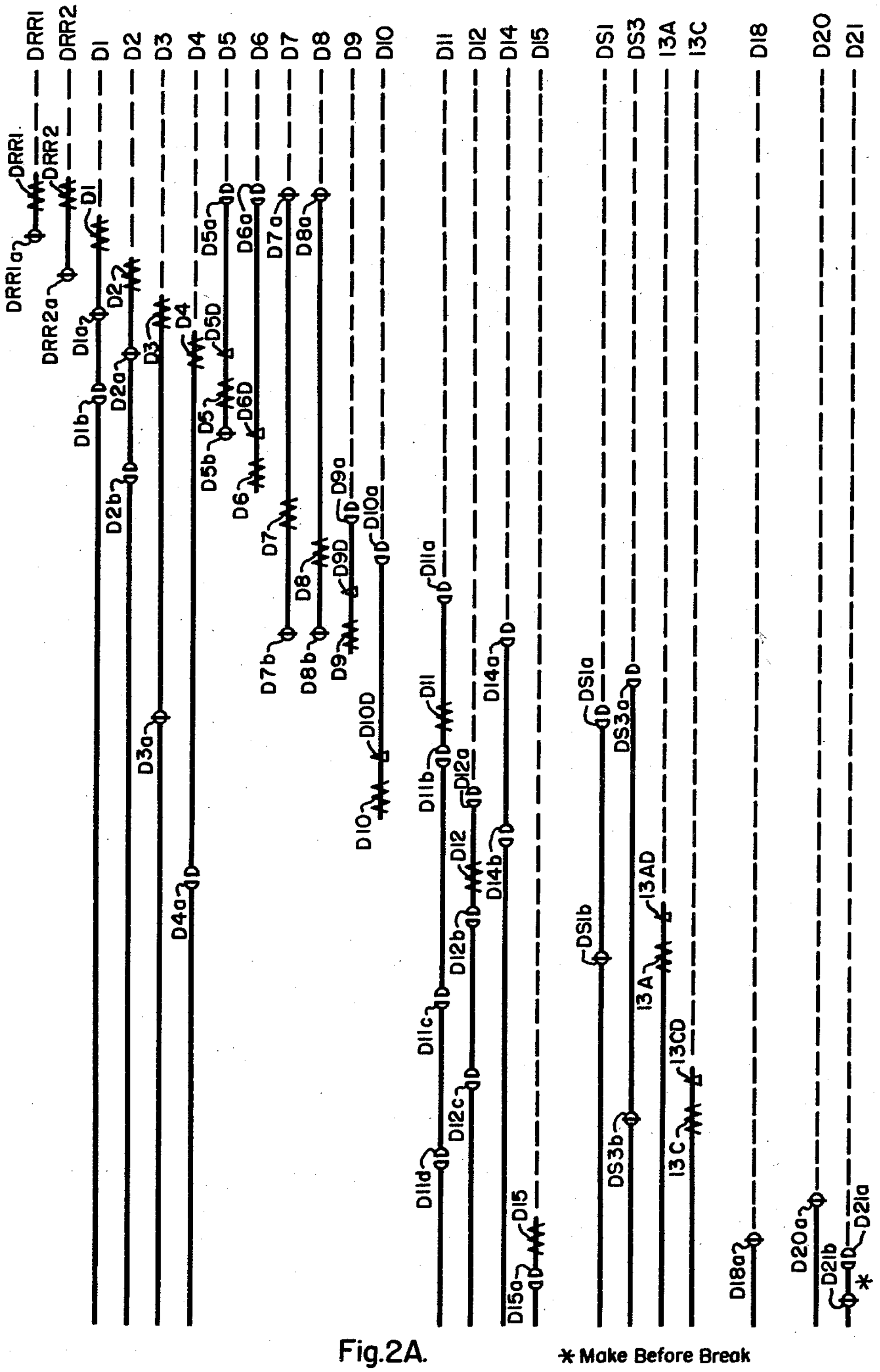
Figure 2B:
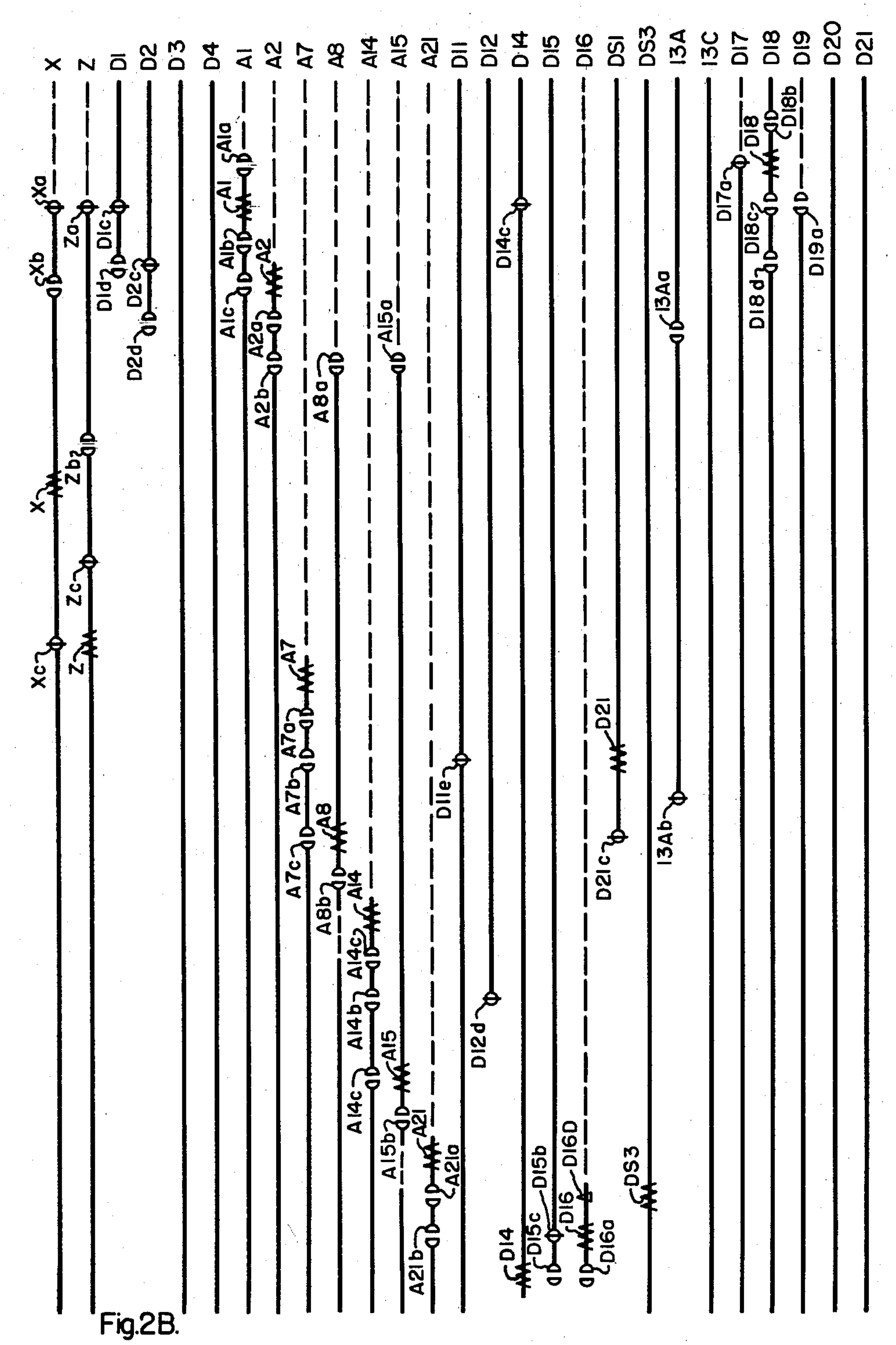
Figure 2C:
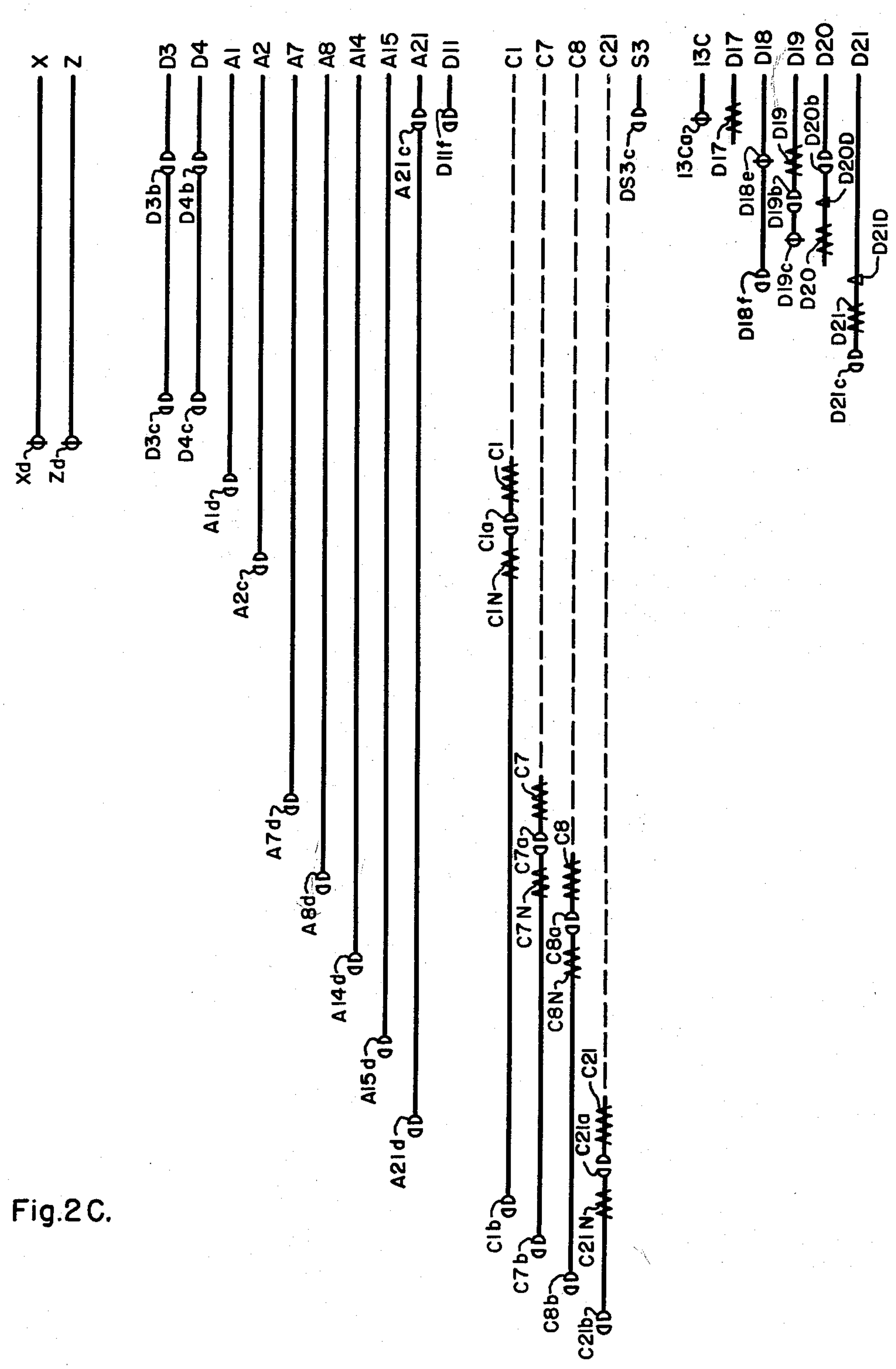

FIGS. 2A through 2C, when placed one below the other in order, and in side by side relationship with FIGS. 1A through 1C, respectively, are a schematic representation of the stems of characteristic ones of the relays shown in FIGS. 1A through 1C.

Figure 5:
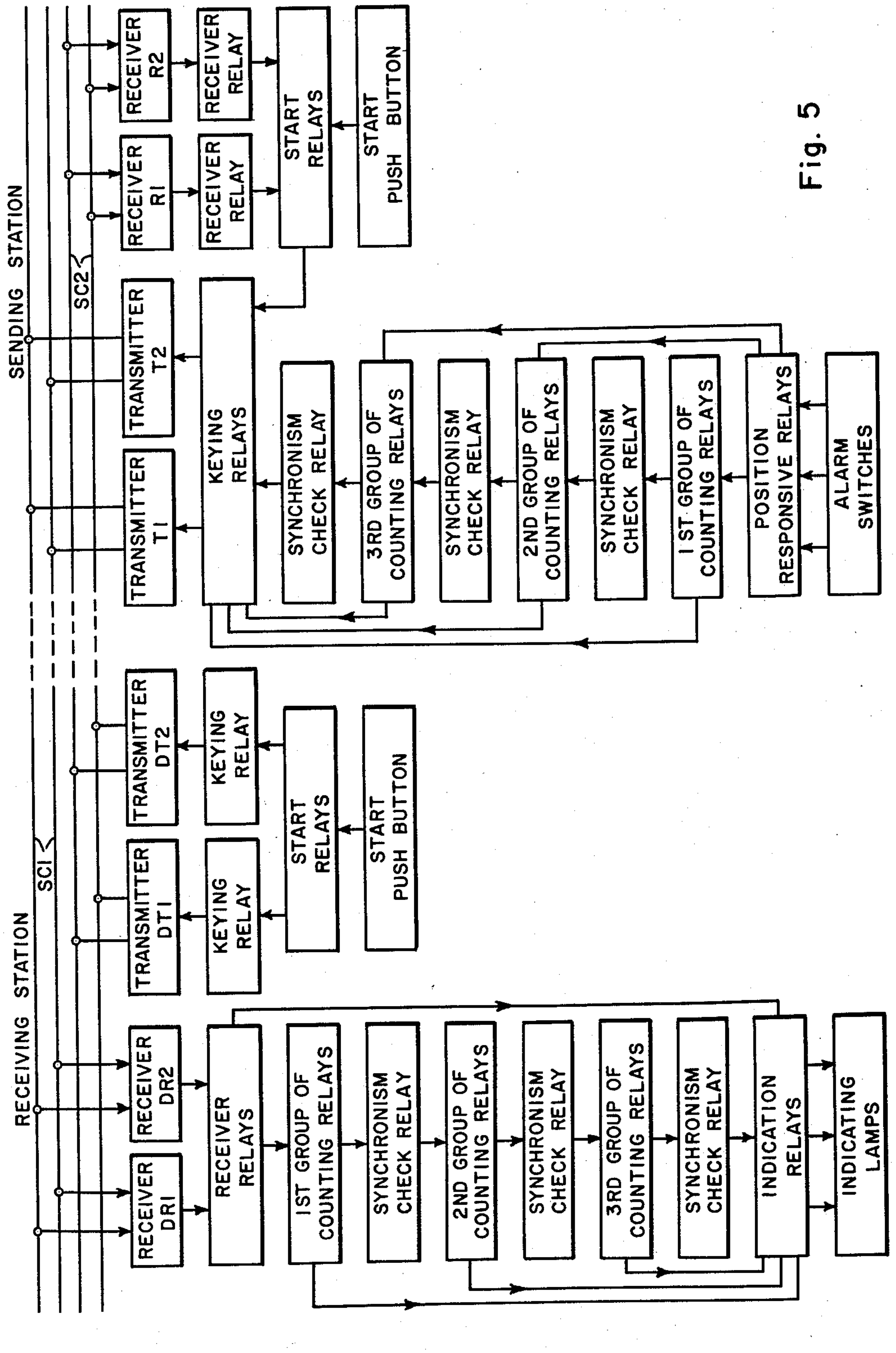

FIGS. 3A through 3D, when placed one below the other in order, are a schematic diagram of indication apparatus at a remote or transmitting station cooperating with the apparatus at the receiving or decoding station of FIGS. 1A through 1C;

FIGS. 4A through 4D, when placed one below the other in order, and in side by side relationship with FIGS. 3A through 3D, respectively, are a schematic representation of the stems of characteristic ones of the relays shown in FIGS. 3A through 3D; and FIG. 5 is a block diagram of the remote indication signal system.

Figure 3A:
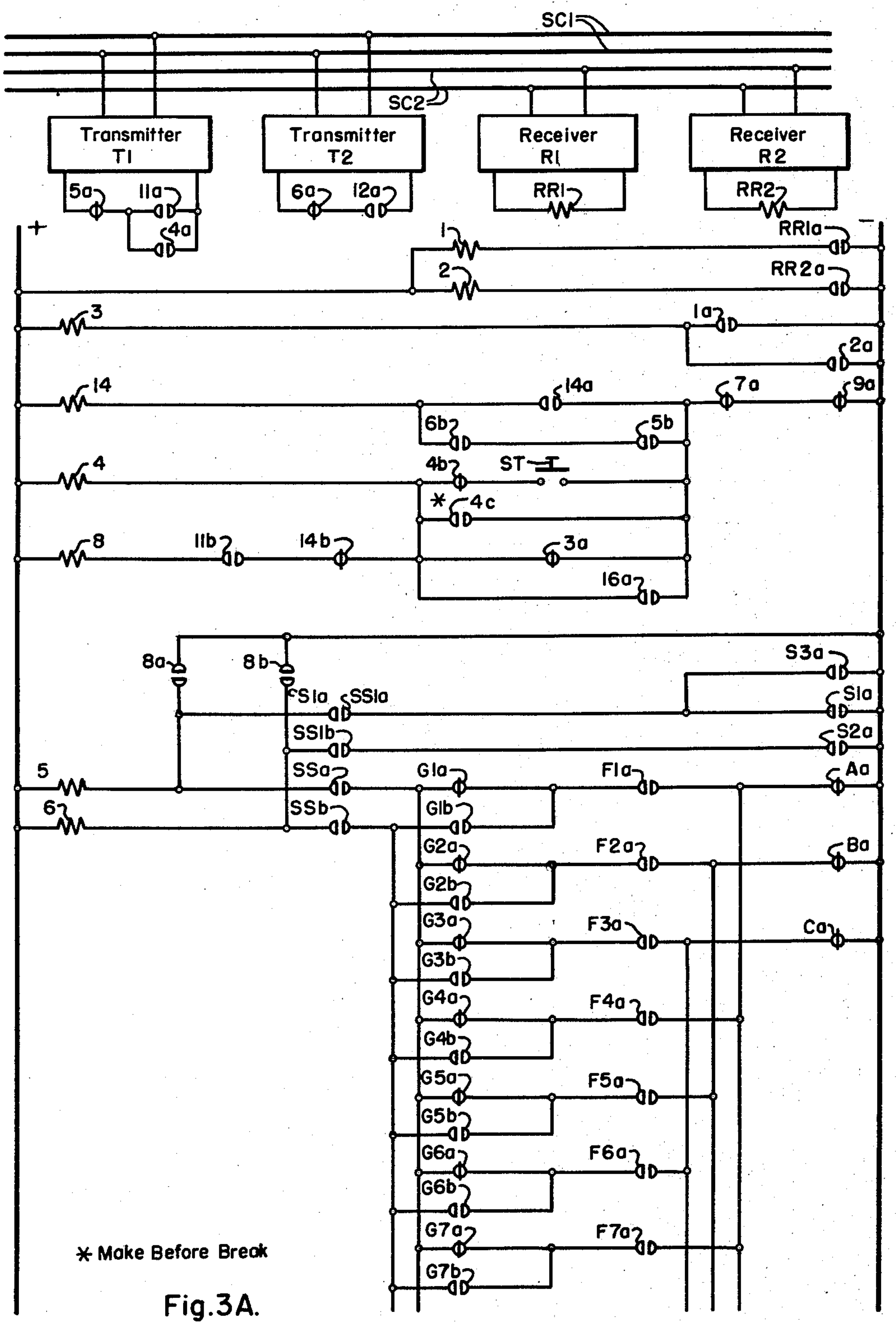
Figure 3B:
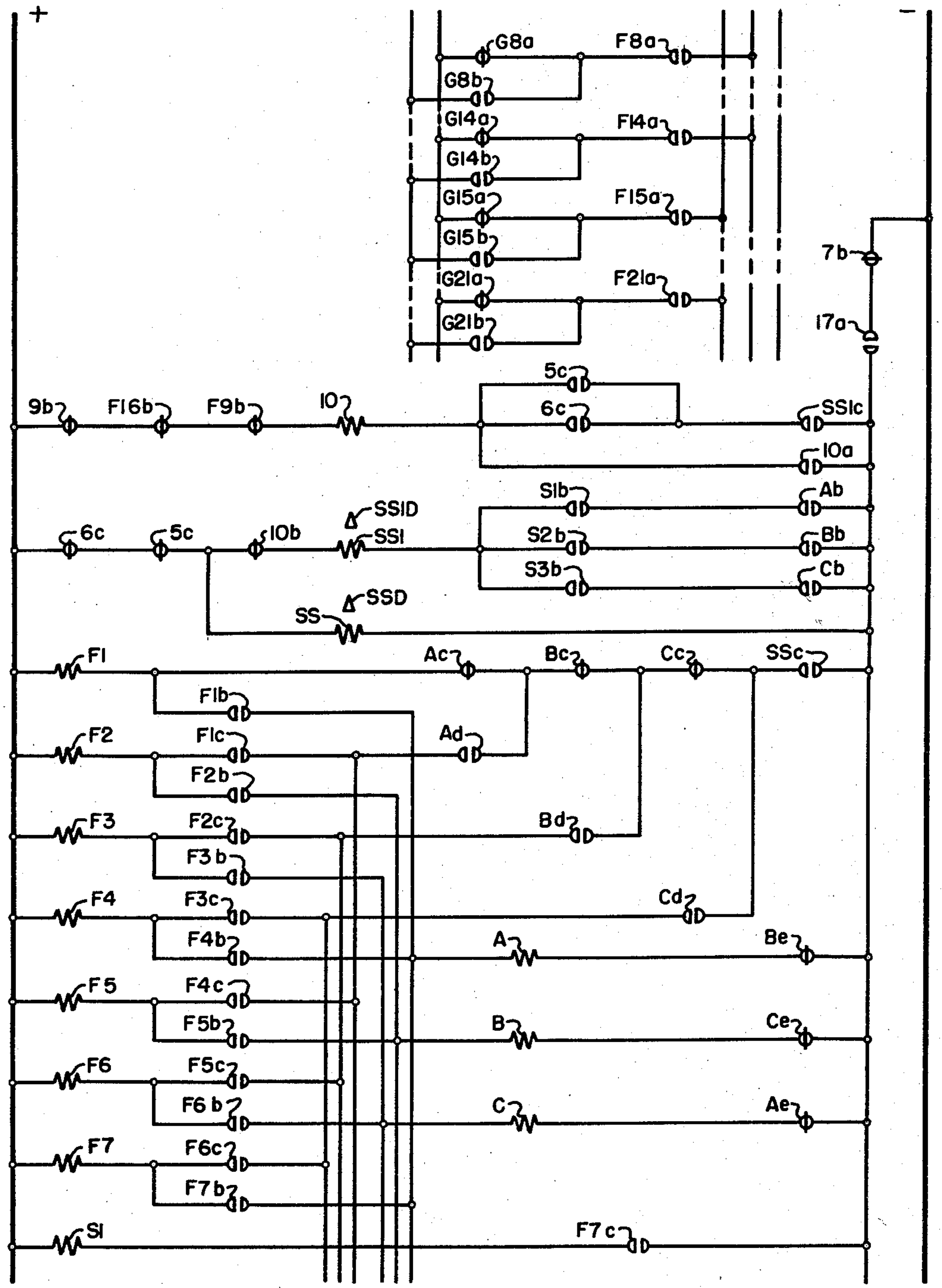
Figure 3C:
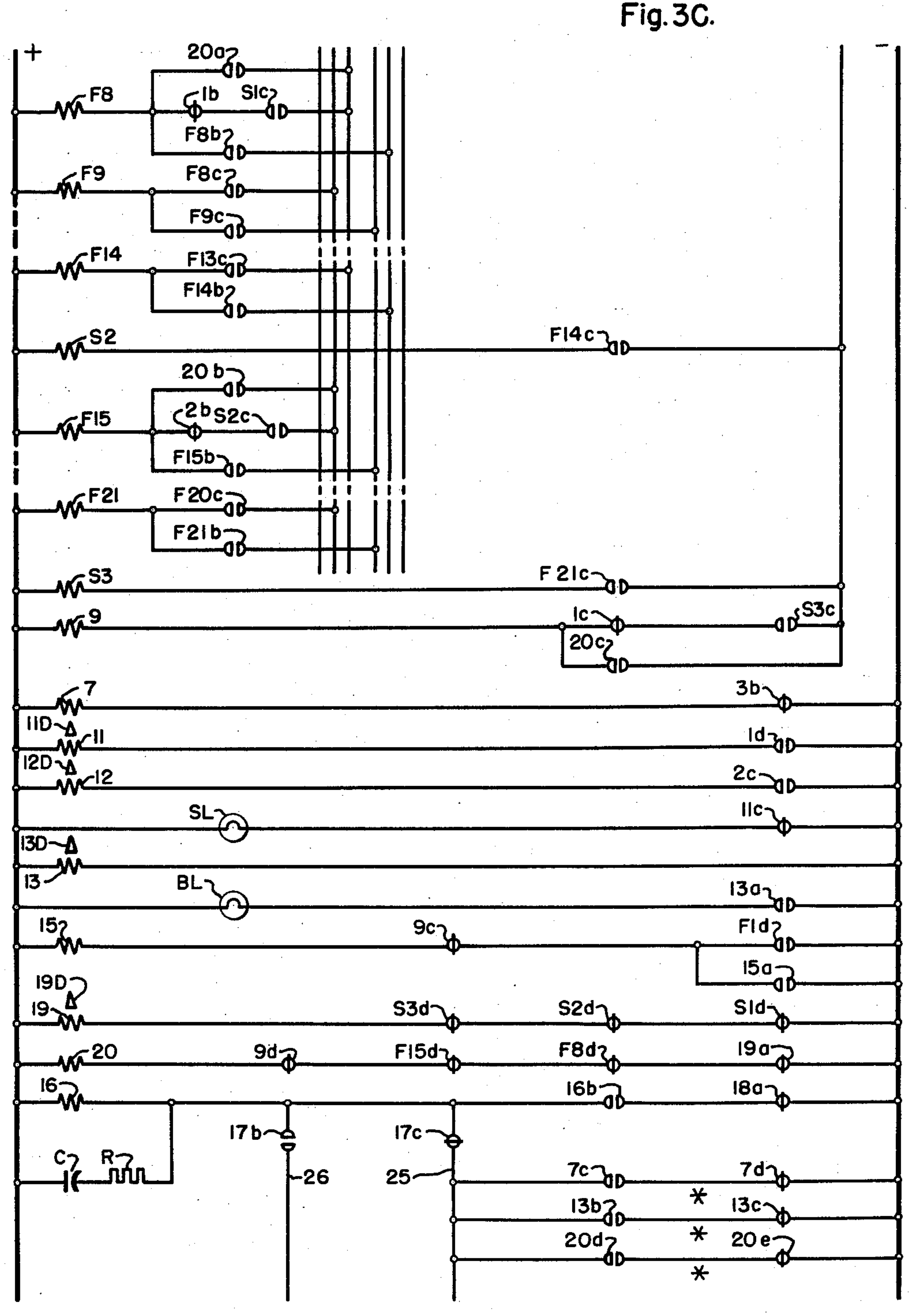

Referring generally to FIGS. 1A and 3A, it will be seen that transmitters T1 and T2 at a remote or transmitting station are connected to the conductors of a signal channel SC1 for transmitting coded signals of different tone frequencies, such as F1 and F2, to receivers DR1 and DR2 at a receiving or decoding station. Transmitters DT1 and DT2 are located at the decoding station and are connected to the conductors of a separate signal channel SC2 for transmitting coded signals of tone frequencies F1 and F2 to the remote station where they are received by receivers R1 and R2 connected to the signal channel SC2. The transmitters T1, T2, DT1 and DT2 may be of the frequency shift tone type, normally operating on a high frequency and shifting to the lower F1 or F2 frequency when keyed, or they could be of a single frequency type, normally transmitting, and turned off when keyed.

Figure 3D:
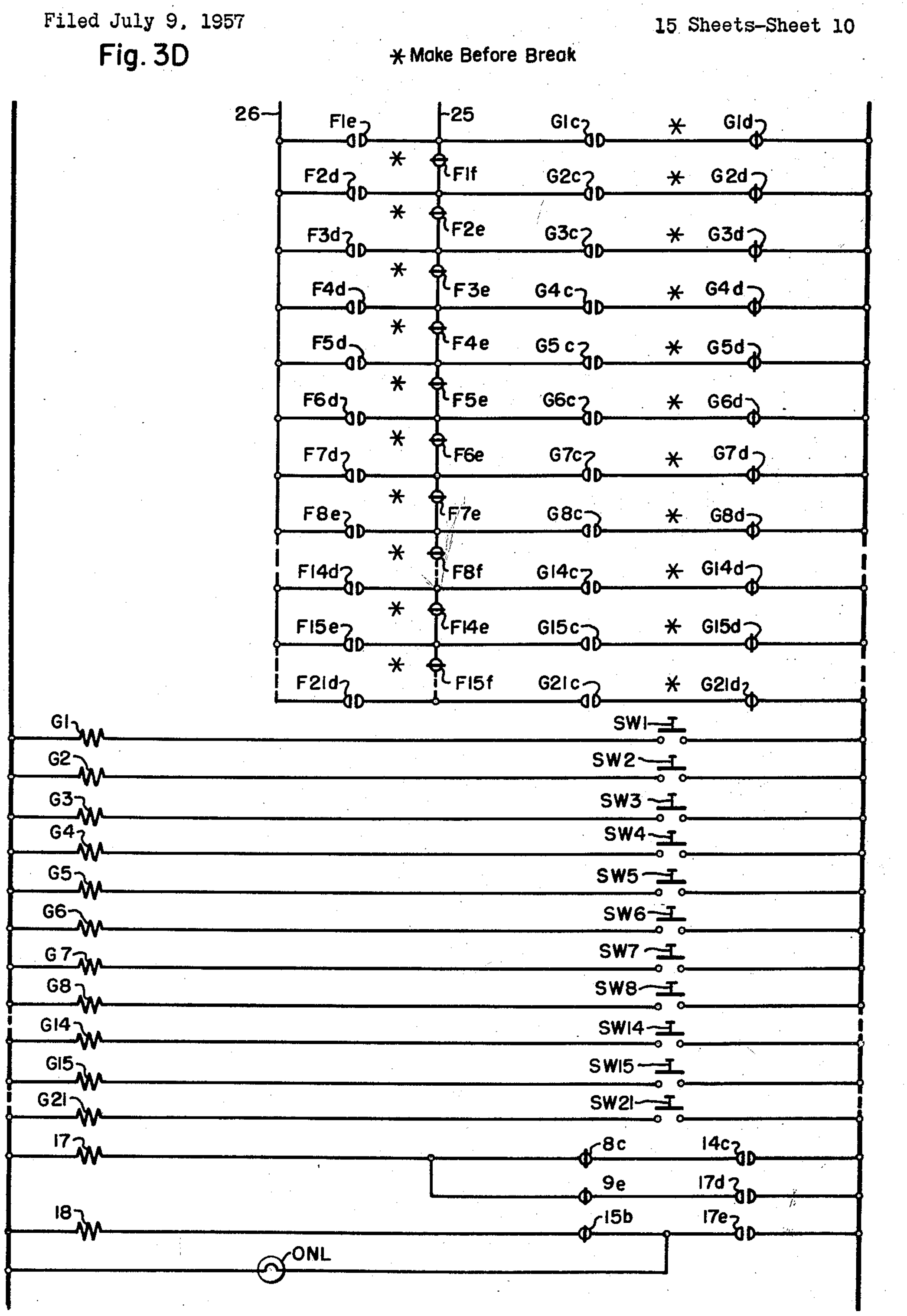
Figure 4A:
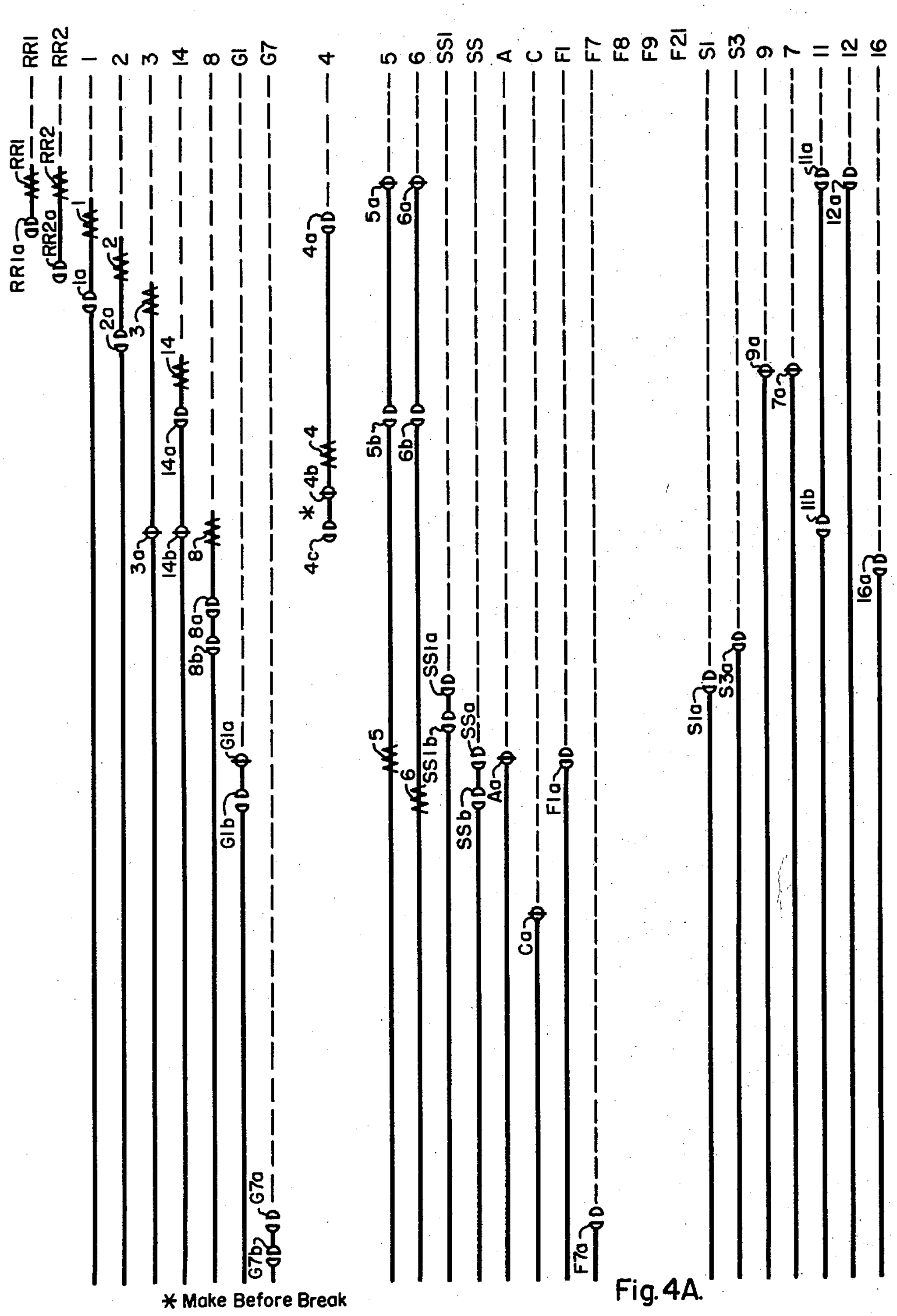
Figure 4B:
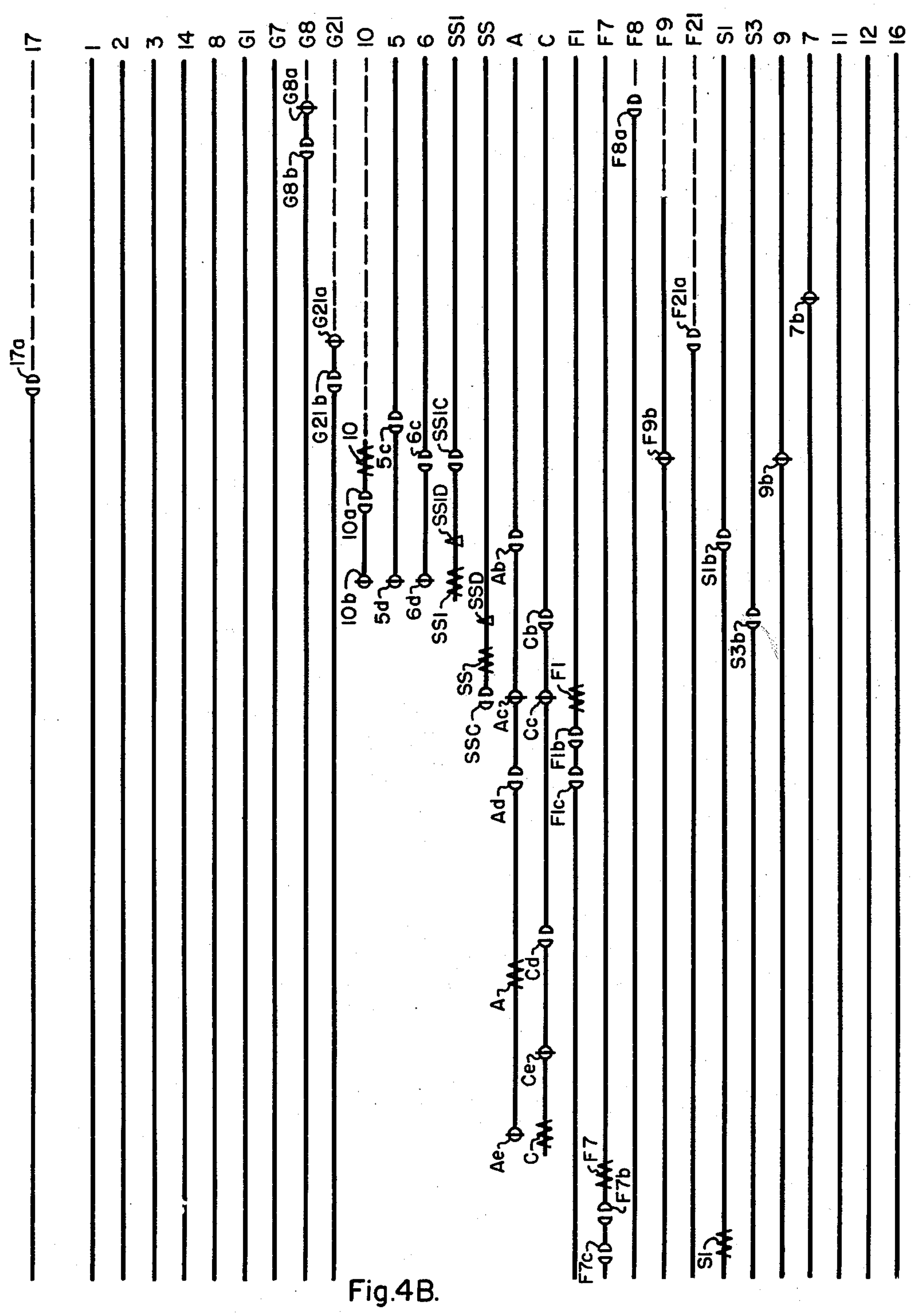
Figure 4C:
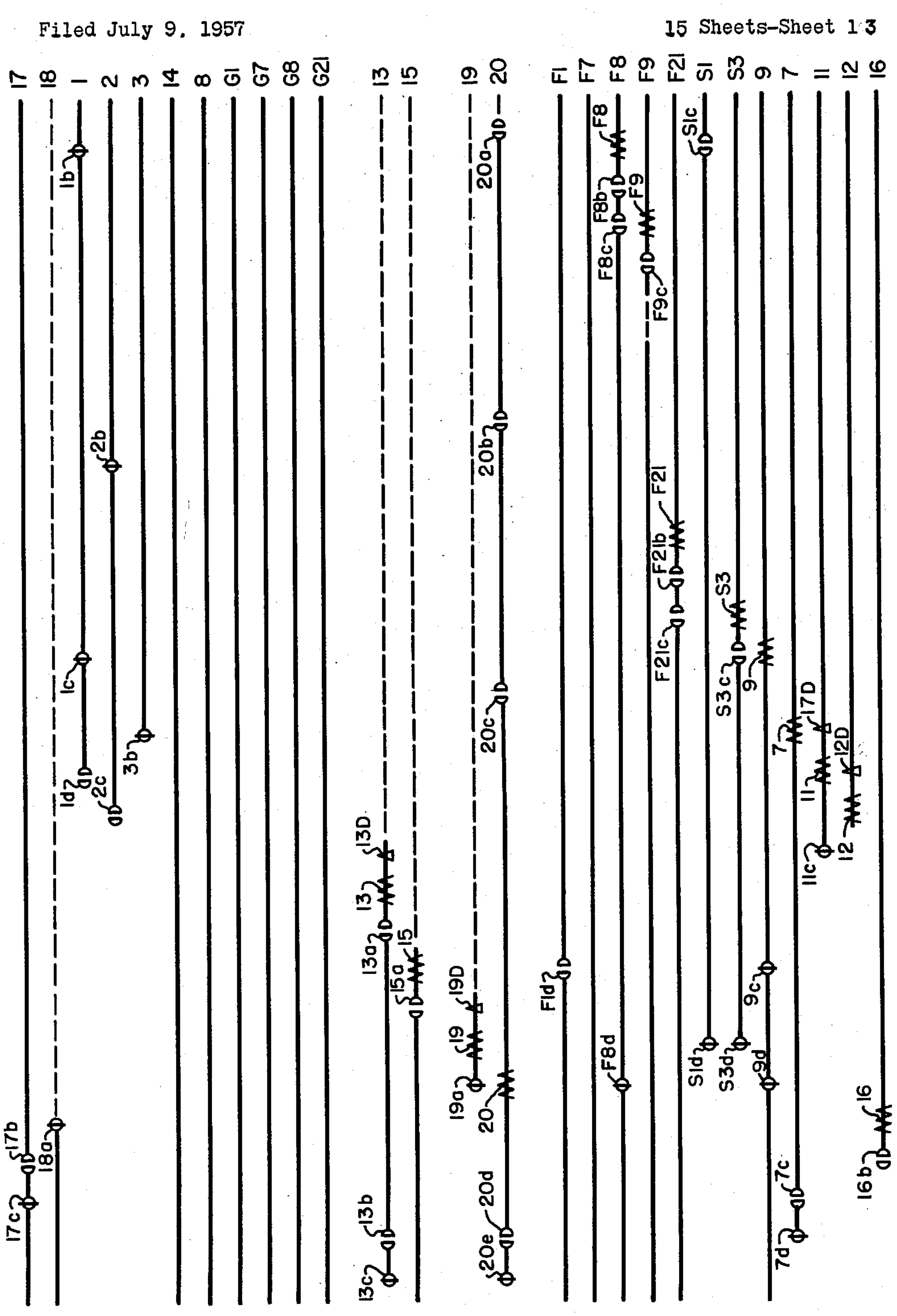
Figure 4D:
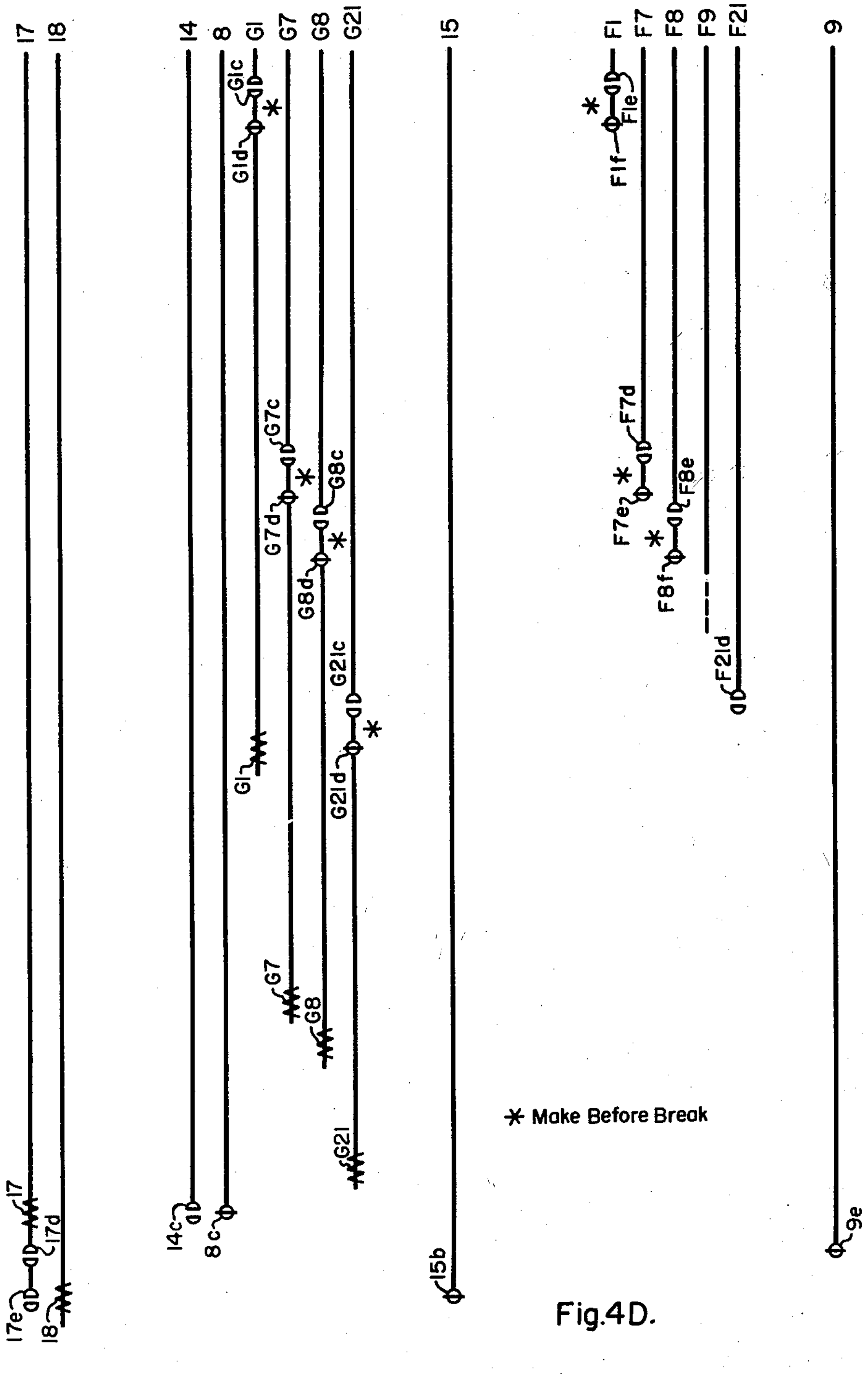

In order to provide for indicating the positions or operating conditions of a plurality of devices, such as switches, circuit breakers, radio or radar equipment, or the like, at the remote station, a plurality of switches SW1 through SW21 are provided at the remote station, as shown in FIG. 3D, actuated by the devices for operating a plurality of position responsive relays G1 through G21. These position responsive relays are utilized in conjunction with a plurality of counting relays F1 through F21 and an auxiliary indication pulse control relay SS (FIGS. 3A and 3B) to effect the operation of keying relays 5 and 6 for shifting the tone frequency of the transmitters T1 and T2 from a normal tone frequency to a signal tone frequency for sending signals in accordance with the positions of the switches or breakers. Sequence relays A, B and C are used in conjunction with the counting relays in a well-known manner for effecting sequential operation of the counting relays in response to operation of a pulsing relay SS and an auxiliary synchronizing pulse control relay SS1.

A start relay 4 is provided for operation under the control of a remote start relay 3 which is controlled by auxiliary tone receiver relays 1 and 2 operated by the receivers R1 and R2, or a change-of-status detection relay 16 (FIG. 3C) operated by the G relays. For effecting operation of an auxiliary channel supervision relay 8 to set up operating circuits for keying relays 5 and 6 of transmitters T1 and T2, an auxiliary remote start relay 7 (FIG. 3C) is operated by the start relay 3, and to also cause a change-of-status relay 16 to function and release the pulsing relays or counting F1 through F21. An energy storage circuit of capacitor C and resistor R is connected about relay 16 to insure positive operation. Channel supervision relays 11 and 12 are provided, being of a delayed operation type. These relays are normally energized from the receiving station through auxiliary tone receiver relays 1 and 2, and override the normal signal pulses, but are released for abnormal channel signals or interruption of the channel circuit. Relay 11 controls a channel supervision lamp SL.

In order to provide for checking the synchronization of the equipment at the receiving station with that of the remote station during transmission of indication signals, synchronization check relays S1, S2 and S3 are interposed between successive groups F1–F7 and F8–F14 of the counting relays F1 through F21, and at the end of the last group for transmitting through operation of the keying relays 5 and 6 a predetermined check signal after each group of indication signals. A timing relay 19 of the delayed dropout type is controlled by the check relays, and if a return check signal is not received within a predetermined time from the receiving or control station, it effects operation of a synchronization check failure relay 20 to cause operation of an out-of-synchronism and end-of-operation relay 9 to reset the remote station equipment. An auxiliary synchronizing pulse relay 10 operates in conjunction with an auxiliary synchronization pulse control relay SS1 to cause the transmission of only a single synchronizing pulse each time. A power failure relay 13 controls a battery lamp BL and operates in response to a power failure at the remote station and causes the change-of-status detector relay 16 to operate when power is re-established so as to effect a scanning operation. An end-of-start relay 14 operates when the start signal is transmitted to control operation of relay 8 and keying relays 5 and 6. A start-of-indication pulsing relay 15 is provided, which functions when the first indication pulse is transmitted to cause release of a permissive change-of-status relay 18 for resetting the change-of-status relay 16 before a scanning operation starts. An auxiliary status detection relay 17 is provided, which controls an off-normal lamp ONL, and functions after the start pulses are transmitted to transfer the change-of-status relay 16 so that it will not respond to a change in status of a device which has not yet been scanned, but will respond to a change in status of a device which has already been scanned, so as to start another scanning operation immediately following completion of the one still in progress.

Referring to FIGS. 1A through 1C, it will be seen that auxiliary tone receiver relays D1 and D2 responsive to frequency shift tone signals F1 and F2 respectively, are provided at the control, decoding or receiving station for controlling the operation of channel supervision relay D5 and channel supervision relay D6, which are of the delayed operation type, having delay windings D5D and D6D, as well as pulse drive relays D3 and D4, which control the operation of a plurality of indication relays C1 through C21 corresponding to the switches SW1 through SW21 at the remote station. Relay D5 also controls a channel supervision lamp DSL. The indication relays C1 through C21 are of the double coil type having main operating windings C1 through C21, respectively, and opposing neutralizing windings C1N through C21N, respectively, which have fewer turns than the main windings, so that with the main winding energized, a relay will pick up, with both windings energized a relay will remain operated, but with the main winding shunted it will return rapidly to the deenergized position.

A plurality of counting relays A1 through A21 are operated by the receiver relays D1 and D2 to count signal pulses received from the remote station, and control the energizing circuits for the indication relays C1 through C21. Sequence relays X, Y and Z are utilized in conjunction with the counting relays to effect successive operation thereof in a manner well known in the art. Synchronization check relays DS1, DS2 and DS3 are interposed after each group of counting relays to effect operation of post synchronizing timing relays 13A, 13B and 13C, of the delayed type having delay windings 13AD, 13BD and 13CD, and which function after first, second and third groups of indication signals are received to reset the counting relays for the next group or for the end of the operation.

A synchronizing auxiliary relay D11 functions to set up a pulse control delay relay D9 having a delay winding D9D for the start, first and third synchronization check pulse operations. An additional synchronization auxiliary relay D12 functions to set up a pulse control delay relay D10 having a delay winding D10D for the start and second synchronization check pulse operation. Keying relays D7 and D8 are controlled by relays D9 and D10 to key frequency shift tone transmitters DT1 and DT2, respectively. A receiver-auxiliary-start relay D14 functions to establish operation of relays D9 and D10 to send start pulses of frequencies F1 and F2. A receiver-start-relay 15 functions when the start push button DST at the receiving or decoding station is operated, whenever a power failure relay D20 having a delay winding D20D is operated, or when start pulses of frequencies F1 and F2 are received from the transmitter. An energy storage circuit of a capacitor DC and resistor DR is connected about the relay D15 to insure positive operation. An indication-of-start relay D19 is provided which operates whenever start pulses or frequencies F1 or F2 are received, or whenever a channel failure occurs. A start-of-indication pulsing relay D18 is provided which controls an off-normal lamp DON and functions when the first indication pulse is received to effect operation of receiver-start relay D15 in conjunction with the auxiliary timing relay 20, a power failure relay D21 controls a power supply lamp PSL and effects operation of the start relay D15 in response to a power failure. An auxiliary start timing relay D16 having a delay winding D16D is provided for controlling the operation of the auxiliary start relay D14. An end-of-operation or reset relay D17 operates after the third group of indication pulses is received and the synchronizing check pulse is transmitted to release or reset the counting relays.

The transmitters T1, T2, DT1 and DT2 are of the frequency shift type. Each frequency shift tone is normally transmitted at its upper frequency for the normal condition, and the tone is shifted to its lower frequency such as F1 and F2, for the transmission of a signal pulse.

System scanning is started either manually or automatically. Manual starting is accomplished by operating either the system transmitter push button ST or the system receiver push button DST. Automatic starting is performed when any one of the alarm switches SW1 through SW21 operates.

In a manual starting operation from the system transmitter or remote station, the start push button ST is operated, causing relay 4 to operate and seal in. Relay 4 completes the circuit of transmitter T1 if it is not already operating. If relay 11, which is normally energized, as a result of the transmitter at the receiving station being energized, is energized, relay 8 operates and provides an energizing circuit for the keying relays 5 and 6 which operate to shift the tone frequencies and send a start signal of frequencies F1 and F2 to the system receiver or decoding station. The length of the start signal is governed by the operation of relays 5 and 6 and the energizing of relay 14, which deenergizes relay 9 to interrupt the circuit for the keying relays.

The start signal of tones F1 and F2 is received by the receivers DR1 and DR2, causing receiving relays DRR1 and DRR2 to deenergize in turn deenergizing receiving relays D1 and D2 to effect energization of relays D3 and D4, thus effecting operation of relay D19, which prepares the counting relays A1 through A21 for operation.

When the scanning operation is started from the decoding or receiving station, push button DST is operated to effect operation of relay D15 so as to effect operation of relay D14. This effects operation of relays D9 and D10 which energize relays D7 and D8, respectively. Operation of relays D7 and D8 opens the keying circuits to the transmitters DT1 and DT2 for sending a system receiver start signal. Relay D16, which is of the slow release type, is released. Relay D14 is deenergized, and the relays D9 and D10 are opened so as to effect operation of relays D7 and D8 only once. The start signal is received by the transmitter receivers R1 and R2 which deenergize receiving relays RR1 and RR2, causing receiving relays 1 and 2 to be momentarily released to effect deenergization of relay 3, which operates the start relay 4 to start the prestart procedures just as described for manual starting from the system transmitter.

With the system in a normal condition, operation of any alarm switch SW1 through SW21 causes the associated G relay to be energized or released. The change-of-status detection relay 16 is thereupon operated to effect operation of the start relay 4 to commence the prestart procedures as described for manual starting from the system transmitter.

After each group of indication signals, a scanning check signal is transmitted, and one of synchronization check signal relay S1, S2 or S3 is operated in turn to release the timing relay 19. If a return synchronization check signal of a predetermined frequency is not received within a predetermined time, the synchronous check failure relay 20 is operated, and the change-of-status detection relay 16 is energized, so that after a scanning operation is completed, another scanning operation will be automatically started.

In a scanning operation, a signal is transmitted for each switch position to be indicated. A signal F1 is transmitted if an alarm switch is open, and a signal F2 is transmitted if the alarm switch is closed. The pulses are transmitted in succession as each alarm position is scanned by operation of the counting relays F1 through F21, A, B and C. The receivers DR1 and DR2 are selectively operated in accordance with the signals received, and the associated indication lamp for each alarm switch is lighted or extinguished as determined by the received signal F1 or F2, respectively.

Circuits are provided in the system transmitter so that after a predetermined number of indication signals are sent, a scanning check signal is transmitted to the receiving station. If the transmitter and receiver are in step, the same scanning check signal is transmitted from the receiving station back to the remote station, and the system proceeds with the next group of indications to be scanned. At the end of the second group of indications, another scanning check signal is transmitted to the receiving station and checked in a like manner as for the first group. If, after a time delay, the scanning check signal is not received at the remote station, the transmitter proceeds to scan the second group of points to complete the scanning operation and thereupon recommences a complete scanning cycle.

With the system normally at rest, relays 1, 2, 3, 11, 12, 13 and 19 at the remote station are energized, and relays D1, D2, D5, D6, 13A, 13B, 13C, D16, D20, and D21, at the receiving station together with such of the G and C relays associated with closed alarm switches. For an automatic operation, operation of an alarm switch, such as SW1 at the remote station, effects operation of the corresponding position relay G1. An energizing circuit is thereupon provided for relay 16 extending from operating winding 16 through contact 17*c*, and make-before-break contacts G1*c* and G1*d*. Closure of contact 16*b* provides a holding circuit for relay 16. At the same time, an energizing circuit is provided for the start relay 4 through contact 16*a*, contact 7*a* and contact 9*a*. Contact 4*a* completes a circuit to the transmitter T1 if contact 11*a* is not already closed (as will usually be the case). An energizing circuit for auxiliary channel supervision relay 8 is provided through contacts 11*b*, 14*b*, 4*c*, 7*a* and 9*a*. Contacts 8*a* and 8*b* of relay 8 energize the keying relays 5 and 6 to open contacts 5*a* and 6*a* and effect operation of the transmitters T1 and T2 to shift their tone frequencies and send a start signal of tone frequencies F1 and F2 to the system receiver. End-of-start relay 14 is energized through contacts 6*b* and 5*b*, and opens contact 14*b*, to deenergize relay 8, and terminate the start pulse.

An energizing cirruit is provided for the auxiliary-status-detector relay 17 through contacts 8*c* and 14*c* and transfer contacts 17*b* and 17*c* change position to disconnect the change-of-status detector relay 16 from bus 25, and prevent further operation thereof by any of the switches SW2 through SW21 before their position has been scanned. Relay 16 is connected to bus 26 through contact 17*b* so as to effect operation thereof in response to operation of any of the switches SW1 through SW21 after their positions have been scanned in a particular scanning operation. At the same time, a circuit is provided for the auxiliary pulse control relay SS through contact 17*a*, and relay SS operates to set up circuits to the keying relays 5 and 6 through contacts SS*a* and SS*b*. Contacts SS*c* close and complete an energizing circuit for the first pulse counting relay F1. Contact F1*a* of the pulse counting relay completes a circuit to keying relay 6 through contact G1*b* so that a pulse of frequency F2 is transmitted. The circuit to relay SS is interrupted at contact 6*c*, so that relay SS deenergizes and interrupts the circuit to counting relay F1 at contact SS*c*. Sequence relay A thereupon energizes in series with relay F1 through contact F1*b*, operating winding A and contact B*e*. Operation of relay A opens contact A*a* in series with the keying relay 6, causing the keying relay 6 to release and terminate the first pulse, and relay SS to be energized again for the second pulse through contact 6*c*. The scanning operation continues with one or the other of the keying relays 5 and 6 being operated for the scanning of each of the switches SW2 through SW21, depending on the position of the respective G relay. Tone signals of frequency F1 or F2 are transmitted in order, for each of the switches as the counting relays F1 through F7 operate with their associated sequence relays A, B and C the usual manner of a counting chain.

When counting relay F7 operates, a circuit is provided for the synchronization check relay S1 through contact F7*c*. A circuit is thereupon provided for relay SS1 through contact S1*b*, and when the seventh pulse is complete, relay A operates in series with relay F7 and the circuit for relay SS1 is completed through contact A*b*. The keying relay 5 is operated through contacts SS1*a* and contact S1*a* to send a tone signal of frequency F1 to the system receiver for the first scanning check signal. When relay 5 operates, relay 10 is operated through contacts 5*c* and SS1*c* to effect deenergization of relay SS1 at back contact 10*b*. This provides interlocking, so that only a single check pulse is transmitted. Operation of check relay S1 opens contact S1*d*, and interrupts the energizing circuit for the timing relay 19, which commences to time out.

At the system receiver the start signal which is transmitted over both channels operates receivers DR1 and DR2, causing relays D1 and D2 to be deenergized. Relays D3 and D4 are then energized and D19 is energized through D4*b*, D3*b*, D18*e* and locks in through D19*b*. D20D then is deenergized but does not drop out.

The first indication pulse of frequency F2 at the system receiver causes release of receiving relay DRR2, opening contacts DRR2*a* so as to effect deenergization of relay D2 and energization of relay D4 through contact D2*a*. Counting relay A1 is operated by a circuit extending through the operating winding A1, contacts X*a*, contacts Y*a*, contacts Z*a*, contacts D19*a*, contacts D2*c*, contacts D1*d* and contacts D14*c*. Contact A1*d* closes and an energizing circuit is provided for the operating winding C1 of indication relay C1 extending through a current limiting resistor CLR, contact D4*c*, contact X*d*, contact A1*d* and the operatng winding C1. Indication relay C1, therefore, operates and lights the lamp L1 through contact C1*b* to indicate that the switch SW1 at the remote station is closed.

In addition, the coil of D18 is energized at A1*a*. This deenergizes D19 and reenergizes D20. In the event that an indication pulse is not received with the timing interval of D20, D20 drops out, resetting D19. Another starting pulse is now necessary to start a signalling cycle.

Successive signals release either relay D1 or D2, to successively operate the counting relays A2 through A7 in conjunction with their sequence relays X, Y and Z in the usual manner. Contacts of the counting relays are used in the circuits of the indication relays C1 through C7 in conjunction with the contacts D4*c* and D3*c* to selectively operate or release the C relays so as to light or extinguish their respective lamps.

At the system receiver, check relay DS1 is operated through a contact A7*b* when counting relay A7 operates. A circuit is prepared to relay D11 through contacts DS1*a*, and when a tone signal of frequency F1 is received for the scanning check signal, the receiver DR1 deenergizes its receiving relay DRR1 to complete a circuit for relay D3 through contact D1*a*. A circuit is thereby completed for relay D11, extending through contact D8*b*, D7*b*, operating winding D11, contact D3*a*, and contact DS1*a*. Operation of relay D11 completes a circuit for relay D9 at contact D11*a*. Keying relay D7 is thereupon energized at contact D9*a*, and contact D7*a* opens to provide for sending a single scanning check tone signal of frequency F1 to the transmitter or remote station. A contact D11*e* interrupts the energizing circuit for the check signal relay DS1, and contact DS1*c* closes to complete the circuit to counting relay A8 for receiving the first pulse of the second group of indication signals in response to deenergization of relay D1 or D2.

At the remote or transmitting station, the frequency F1 check pulse causes deenergization of the receiving relay RR1 and releases the receiving relay 1. Contact 1*b* closes and a circuit to counting relay F8 is completed through contacts 1*b* and S1*c*, so that relay F8 operates, and a first scanning pulse for the scanning group of indication signals is transmitted in a manner similar to that described hereinbefore for the operation of counting relays F1 through F7.

The procedures for both the second and third group of indications are similar to those described for the first group of indications. The scanning signal for the second group of indications is a tone signal of frequency F2, as determined by contact S2*a* in circuit with the keying relay 6. The check signal for the third group of indications is a tone signal of frequency F1 as determined by contact S3*a* which is connected in circuit with the keying relay 5. When the third scanning check signal from the receiver is received at the remote station, relay 1 is deenergized and relay 9 is operated through contact S3*c* and 1C, and interrupts the circuit for the auxiliary status detector relay 17 at contact 9*e*. Deenergization of relay 17 deenergizes the counting relays F1 through F21 at contact 17*a* and resets the transmitting equipment. Simultaneously, at the control or decoding station relay D11 is energized through contacts D3*a* and DS3*a*, and a circuit through contact D11*f* and contact A21*c* energizes relay D17, which interrupts the circuits of the counting relays A1–A21 at contact D17*a* to reset the equipment.

Thus, when each scanning scan signal is transmitted, a timing circuit is set up. If the return scanning check signal is not received within the predetermined time, the system proceeds with the second group of indications and records the fact that the first group was not scanned successfully. When the system was returned to normal after scanning the first group, it automatically starts a complete scanning cycle again.

Thus, when the system transmitter check relay S1 is operated, the normally energized timing relay 19 is deenergized by the opening of contact S1*d*. If no scanning check signal is received, relay 19 will be fully released to complete an energizing circuit for relay 20 at contact 19*a*. A contact 20*a* completes a circuit for the counting relay F8 to start scanning the second group. Make-before-break contacts 20*d*, 20*e*, of relay 20 energizes the change-of-status detection relay 16 to remember to restart a scanning operation immediately after the completion of the third group of indications. Contacts 20*b* and 20*c* of relay 20 are also used to start scanning the third group and to operate relay 9, if no scanning check signal is received after the second and third groups are scanned.

If battery is lost at the remote station, relay 13 deenergizes and sets up a circuit for change of status detector relay 16 to start a scanning operation when power is restored. Sending of the usual start signal of F1 and F2 deenergizes both relays D1 and D2 at the receiving station to reset the counting relays in preparation for a scanning operation.

At the control or receiving station, the normally energized timing delay relay 13A is energized by the operating of contacts DS1*b* when the check relay DS1 operates. If no scanning check signal is obtained, relay 13A fully releases after a timed interval to deenergize the counting relays A1 through A7 and the corresponding X, Y or Z relays at contact 13A*a* and complete the circuit to relay A8 at contact 13A*b* to continue with scanning with the second group of indications. Similarly, contacts DS2*b* and DS3*b* release relays 13B and 13C, if no check signals are received after the second and third groups, to prepare the system receiver for the third group of scanning pulses, and for returning the system to normal, respectively.

From the above description and the accompanying drawings, it will be realized that we have provided for obtaining indications of a plurality of devices at a remote location in a simple and effective manner. By utilizing check pulses of a predetermined nature between or following different groups of indications, it may be readily ascertained whether the control station or receiver is operating in synchronism with the remote or transmitting station. If it is, the scanning operation is continued in the usual manner until all of the devices at the remote location are scanned. Should the check operation indicate that the receiving or control station is out-of-step with the transmitting or remote station, scanning is nevertheless continued for the following group of groups to complete the particular scanning operation, and a subsequent scanning operation is thereupon automatically initiated until a correct check is obtained. While the invention is shown in connection with frequency shift tone transmitters which shift from a normal frequency to another frequency to deenergize receiving relays for a signal, it will be realized that signals may comprise either the existence or absence of a tone, as well as the transfer from one frequency to another.

Since certain changes may be made in the above described construction and different embodiments of the invention may be made without departing from the spirit and scope thereof, it is intended that all the matter shown in the above description and shown in the accompanying drawings shall be considered as illustrative and not in a limiting sense.

We claim as our invention:

1. In a remote indication system for a plurality of devices having two operating positions, sending means operable to produce two different signals, positional means operated in accordance with the position of each device, counting means, means including the counting means and the positional means connecting the sending means to effect a scanning operation of the positions of said devices and effect operation of the sending means to transmit one of said signals for each of the devices depending on the position thereof, and check means operable at predetermined points in the scanning operation to send a synchronization check signal comprising one or the other of said different signals independently of what the scanning signals are.

2. In a remote indication system, sending means operable to produce two different signals, position responsive means operated in accordance with the position of each of a plurality of devices, counting means, circuit means including the position responsive means and the counting means operable to effect a scanning operation by effecting operation of the sending means to produce the one signal or the other, starting means operable to start the counting means, means operable to effect operation of the sending means to produce different predetermined synchronization check signals at predetermined points in the scanning operation, and delay means operable to effect operation of the counting means to continue a scanning operation after each synchronization check signal.

3. In a remote indication system for a plurality of devices each having two operating positions, sending means operable to produce different signals, counting means operable to count said signals to effect a scanning operation of the devices, start means operable to start the sending means, means operable by the devices to cause the sending means to produce one signal or the other in accordance with the position of its associated device and effect operation of the start means, check means effecting operation of the sending means to produce a predetermined one or the other of said signals as a synchronization check signal at predetermined positions in a scanning operation, means at a remote station operated by the synchronization check signals to return a synchronization check signal, and means operated by the returned check signal to restart the counting means to continue the scanning operation.

4. In an indication system, sending means at one station operable to produce two different signals, means operated by a plurality of devices in accordance with the position of the devices, means including counting means and said position responsive means effecting operation of the sending means to scan the positions of the devices and produce one signal or the other for each of the devices in accordance with its position, synchronization check means operable to effect operation of the sending means to produce a predetermined one of said signals as a check signal after predetermined ones of the position signals during a scanning operation, means at a remote station operated by the synchronization check signal to return a corresponding synchronization check signal, delay means operated by the synchronization check means to continue operation of the counting means to the end of the scanning operation and effect initiation of another scanning operation, and means actuated by the return synchronization check signal to prevent operation of the delay means and effect operation of the counting means to complete the scanning operation.

5. In a position indicating system for a plurality of devices, sending means operable to produce two distinctive signals, counting means operable to effect operation of the sending means to produce a signal for each device, means operated by the devices to control operation of the sending means to produce a signal of one kind or the other dependent on the position of the device, start means operable to effect operation of the counting means, means responsive to operation of the counting means to effect operation of the sending means to send a predetermined check signal at predetermined intervals during a counting operation, means at a remote station operated by the check signal to send a return check signal, delay means at the location of the devices operable a predetermined time after sending a check signal to cause the counting means to continue a counting operation and effect operation of the start means to start another counting operation following completion of a previous one, and means at the location of the devices operated by the return check signal operable to cause the counting means to continue the counting operation and to prevent operation of the delay means.

6. In an indication system at one station for a plurality of devices at another station, a plurality of indicating means at said one station, receiving means at said one station individually responsive to a different one of two different types of signals, sending means at said one station operable to produce two different signals, counting means at said one station operated in successive groups by either of the receiving means, synchronization check means operated by the counting means of each group at the end of corresponding group count, means including said check means connected to operate the sending means to produce a predetermined one of said signals and condition the next group of counting means for operation in response to operation of the receiving means, and circuit means including the receiving means and counting means connected to effect selective operation of the indicating means.

7. In a system for indicating at one station the positions of a plurality of devices at a remote station, sending means at the remote station operable to produce different signals, means at the remote station operated in accordance with the position of the devices, counting means cooperative with the position responsive means to effect operation of the sending means to produce signals in accordance with a group of the devices, synchronization check means operated at the end of said group count to effect operation of the sending means to produce a predetermined synchronization check signal, receiving means at the one station selectively operated by the signals, counting means at the one station operated in groups by the receiving means, indicating means at said one station selectively operated by the receiving and counting means to indicate the positions of the devices, synchronization check means at said one station operated at the end of a group in response to selective operation of the receiving means by said predetermined synchronization check signal to effect operation of the sending means at said one station to produce a predetermined synchronization check signal and prepare the counting means for the next group count, and means at the remote station responsive to said check signal to effect operation of the remote station counting means to start another group count.

8. In an indication system for a plurality of devices at a remote station, sending means at the remote station operable to produce one signal or the other, means including counting means and means responsive to the position of the devices operable to effect selective operation of the signal means to produce one signal or the other in accordance with the positions of the devices, check means at the remote station operable to effect operation of the sending means to produce a predetermined one or the other of the signals at predetermined intervals in a counting operation, receiving means at another station, counting means at said another station operated by the receiving means thereat, sending means at said another station operable to produce one signal or the other, indicating means selectively operated by the counting means and receiving means jointly, check means including means operated by the counting means in response to the check signal to effect continued operation of the counting means and operation of the sending means at said another station to produce a predetermined one of said signals, and means including the check means and receiving means at the remote station for effecting continued operation of the remote station counting means in response to receipt of the predetermined signal.

9. In combination, receiving means selectively responsive to two different signals, counting means operable in succession by the receiving means, check means connected to operate in response to a predetermined operation of the counting means and effect reset of the counting means after a predetermined interval of time, sending means operable to produce one or the other of two different check signals, and means operated by the check means and the receiving means in response to a predetermined check signal to effect operation of the sending means to return a predetermined check signal and prevent reset of the counting means.

10. In combination, a plurality of indicators operable to one or the other of two positions, a plurality of counting relays having sequence relays sequentially operable in circuit with different ones of the counting relays, check relays interposed between different ones of the counting relays and operated by the preceding counting relay, reset means rendered operable to interrupt the circuit of the sequence and counting relays by the check relays, receiving means selectively operated by different ones of two different signals to effect operation of the counting and sequence relays, circuit means connecting the counting relays and receiving means to effect selective operation of the indicators, sending means operable to produce different check signals, and means operated by a check relay and a predetermined one of the receiving means to render the reset means ineffective and effect operation of the sending means to produce a predetermined one of said different check signals.

11. Binary communication apparatus for communicating between a sending station and a receiving station comprising a first channel between said stations, a second channel between said stations, said channels serving to distinguish between the components of the binary communication system, starting means at said sending station connected to said channels for sending starting signals simultaneously over both said channels, and means at said receiving station responsive only to both said signals to condition said receiving station to receive information signals.

12. Binary communication apparatus for communicating between a sending station and a receiving station comprising a first channel between said stations, a second channel between said stations, said channels serving to distinguish between the components of the binary communication system, starting means at said sending station connected to said channels for sending starting signals simultaneously over both said channels, means at said receiving station responsive only to both said signals to condition said receiving station to receive information signals, and timing means responsive to both said signals to reset said conditioning means if an information signal is not received at said receiving station within a predetermined time interval on the receipt of said starting signals.

References Cited in the file of this patent

UNITED STATES PATENTS

| | | |
|---|---|---|
| 1,749,553 | Wensley | Mar. 4, 1930 |
| 1,790,189 | White | Jan. 27, 1931 |
| 1,806,262 | Moreau | May 19, 1931 |
| 2,135,794 | Burns | Nov. 8, 1938 |
| 2,205,894 | White | June 25, 1940 |
| 2,276,646 | Boswan | Mar. 17, 1942 |
| 2,339,872 | Miller | Jan. 25, 1944 |
| 2,408,037 | Bowsher et al. | Sept. 24, 1946 |
| 2,607,843 | Hearn et al. | Aug. 19, 1952 |
| 2,623,939 | Derr | Dec. 30, 1952 |
| 2,670,463 | Raymond | Feb. 23, 1954 |
| 2,679,637 | Blashfield et al. | May 25, 1954 |